Jan. 28, 1969     E. J. ZULINSKI     3,424,946
METHOD OF ENERGIZING GAS TUBE LIGHT SOURCE
Filed Dec. 20, 1965
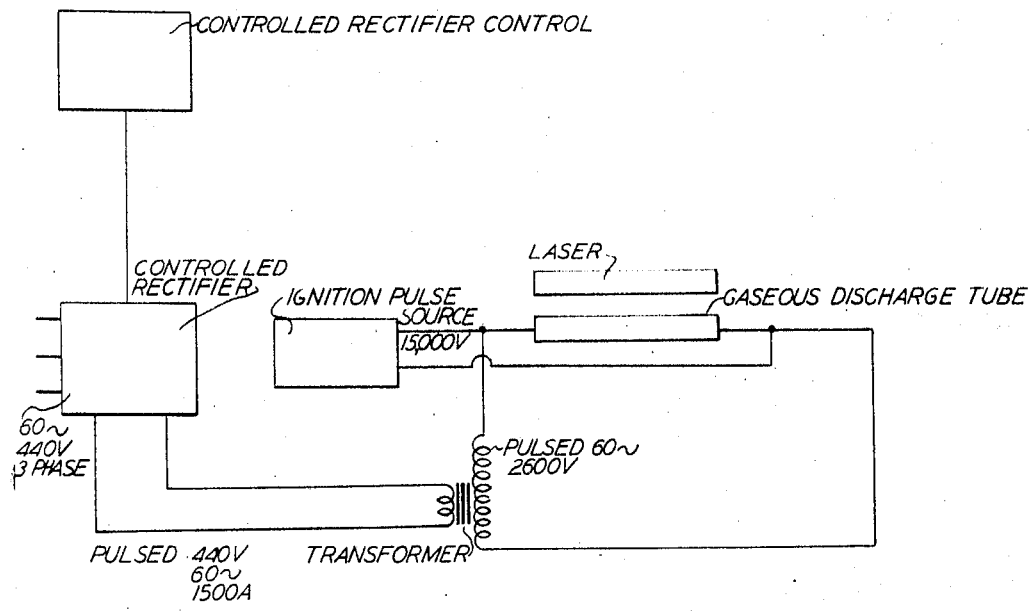
EDWARD J. ZULINSKI
INVENTOR
BY John R. Faulkner
Thomas H. Oster
ATTORNEYS United States Patent Office 3,424,946
Patented Jan. 28, 1969

1

3,424,946
METHOD OF ENERGIZING GAS TUBE
LIGHT SOURCE
Edward J. Zulinski, Berkley, Mich., assignor to Ford
Motor Company, Dearborn, Mich., a corporation of
Delaware
Filed Dec. 20, 1965, Ser. No. 515,244
U.S. Cl. 315—246                3 Claims
Int. Cl. H05b 41/16

ABSTRACT OF THE DISCLOSURE

A process for energizing a gaseous discharge tube light source directly from an alternating current power source of high capacity which employs a controlled rectifier switch means. Through operating the controlled rectifier switch means current flows from the power source through the gaseous discharge tube light source for not more than a small number of cycles, the light source then being permitted to remain idle for a substantial number of cycles. The gaseous discharge tube light source is employed for energizing a welding laser.

This invention is concerned with a process of energizing gaseous discharge tube light sources and more particularly with a method of supplying energy to the light sources employed to pump a laser tube.

Gaseous discharge illumination sources are characterized by the need for a very high operating current flowing for a very short period of time. These gaseous discharge illumination sources while operating are inherently low ohmic resistance devices and often exhibit a negative resistance. To accommodate these operating characteristics of these gaseous discharge illumination sources they are energized by the discharge of a heavily charged capacitor. The original high resistance of these illumination sources in the quiescent or unionized condition is overcome by applying across the tube a very high voltage pulse from a limited current source. This pulse partially ionizes the gas in the illumination source and permits the working current to follow. Destruction of the tube because of its low working resistance is avoided by the fact that the total energy available from a capacitor is strictly limited and predictable.

These very limitations of available energy from capacitors have become burdensome in the development of very high energy illumination sources, particularly those employed to operate lasers of sufficient size to achieve meaningful welding beams. This difficulty has been successfully solved by the bold step of energizing the illumination source directly from a very high capacity or stiff commercial frequency power source.

A typical three phase commercial power source supplies a continuous succession of complete cycles, normally fifty or sixty such cycles per second. Each complete cycle consists of six pulses evenly divided among the three phases, each phase supplying a single positive pulse and a single negative pulse. Arbitrarily selecting any given pulse, this pulse will be preceded by an earlier pulse by sixty electrical degrees and likewise followed by a similar pulse sixty electrical degrees or in the case of sixty cycle current approximately 16 milliseconds later.

A typical circuit suitable for the execution of this invention is shown in the sole figure of drawing. This figure of drawing is believed to be self-explanatory.

The art of controlling alternating current by means

2 of controlled rectifiers is very highly developed and has long been employed in the welding art. This art employs rectifying devices such as thyratrons, ignitrons and silicon controlled rectifiers. All of these devices are non-conducting in both directions until triggered at which time they become capable of conducting current in only one direction. After triggering these devices again become non-conducting when the current passes through the zero point of that particular pulse. These devices are employed to modulate power by triggering the device at any desired point along the pulse from zero to 180 electrical degrees. They may be constructed to conduct only a portion of a pulse, or any desired number of pulses.

These controlled rectifiers have been arranged to energize the gaseous discharge lamps employed to pump a 100 joule laser tube in a welding apparatus. These controlled rectifiers have been directly connected to a very high capacity and "stiff" industrial power supply. These rectifiers were arranged to pass only a single pulse from a single phase. The line current for this pulse was 1500 amperes and the voltage was 440. The duration of the pulse was 8⅓ milliseconds. This gives a total energy input of approximately 5500 joules. This 440 volt pulse was fed into the primary of a step up transformer. The secondary of this step up transformer produced a corresponding pulse having a voltage of 2600. This pulse was fed directly into the gaseous discharge tube which energized a welding laser. This gaseous discharge tube was triggered with a 15,000 volt pulse to overcome the original resistance of the tube. The output of the laser tube is about 100 joules for each pulse. The rectifiers and the associated circuitry may be set to repeat this operation as frequently as desired within the thermal limitations imposed by the laser tube itself. A typical frequence is 80 pulses per minute.

It is clear that the amount of energy fed to the gaseous discharge tube is capable of modification by selecting the number of pulses permitted to pass from any given phase. If the phases are indicated as X, Y and Z it is clear that the pulse of a given polarity may be obtained by firing only phase X. The amount of energy and the wave form produced can be modified by firing in succession phase X and then phase Y or by firing first phase X followed by phase Z. This may be repeated for as many cycles as desired, or limited to a single cycle. The circuitry for accomplishing this switching is well known and forms no part of this invention. Typical circuits for this purpose are shown in United States Letters Patent 3,188,490, 3,146,-392 and 3,095,513.

I claim as my invention:

1. The process of operating a gaseous discharge illumination device, in which the amount of current flowing during the operating time is of a magnitude which would destroy the gaseous discharge illumination device if continuously applied, comprising energizing the gaseous discharge illumination device, without storage of energy, directly from an alternating current power source of high capacity, said power source and gaseous discharge illumination device being connected through a controlled rectifier switch means, and operating the controlled rectifier switch means to permit current to flow from said power source through the gaseous discharge illumination device for not more than a small number of cycles, and then permitting the gaseous discharge illumination device to remain idle for a substantial number of cycles.

2. The process recited in claim 1 in which the gaseous discharge illumination device is employed to energize a laser tube.

3. The process recited in claim 1 in which the laser tube is employed to energize a welding process.

References Cited

UNITED STATES PATENTS

| | | | |
|---|---|---|---|
| 2,673,943 | 3/1954 | Cooper et al. | 315—262 |
| 3,095,513 | 6/1963 | Lezan | 315—197 X |
| 3,238,390 | 3/1966 | Pinckaers | 315—251 X |
| 3,304,403 | 2/1967 | Harper | 331—94.5 X |
| 3,198,984 | 8/1965 | Franke | 315—200 X |
| 3,278,823 | 10/1966 | Ross | 323—22 |
| 3,243,653 | 3/1966 | Locklin | 315—246 |
| 3,249,805 | 5/1966 | McCabe | 315—100 |
| 3,251,000 | 5/1966 | Suel | 328—73 |

JAMES W. LAWRENCE, *Primary Examiner.*

R. F. HOSSFELD, *Assistant Examiner.*

U.S. Cl. X.R.

315—137, 141; 311—94.5